United States Patent Office 3,240,703
Patented Mar. 15, 1966

3,240,703
STABILIZATION OF ORGANIC SUBSTANCES
Ted Symon, Lombard, and Anthony J. Guarnaccio, Niles, Ill., assignors to Universal Oil Products Company, Des Plaines, Ill., a corporation of Delaware
No Drawing. Filed Dec. 27, 1961, Ser. No. 162,557
10 Claims. (Cl. 252—45.7)

This invention relates to the stabilization of organic substances which normally tend to deteriorate in storage, transportation or in use due to oxidation or other reactions.

The present invention is particularly applicable to the stabilization of polyolefins including polyethylene, polypropylene, polybutylene, copolymers of ethylene and propylene, copolymers of ethylene and butylene and copolymers of propylene and butylene, as well as polymers prepared from one or more higher molecular weight olefins. The polyolefins preferably are of high molecular weight, usually having a molecular weight above 1000 and extending into the hundreds of thousand range. The polyolefins may be of the high density, medium density or low density type. Polyethylene is utilized, for example, as a thermoplastic, molding or coating agent. Because of its high dielectric strength and its resistance to water, polyethylene is particularly advantageous for use as insulators or dielectrics in condensers and other similar electronic equipment. Polyethylene plastics also are used in many other applications. Polypropylene, polybutylene and copolymers of ethylene, propylene and/or butylene also are used in electronic equipment, as well as many other applications. When the polyolefins is used in outdoor exposure as, for example, in light weight outdoor furniture, cover for greenhouses, awnings, etc., it is additionally desirable that the polyolefin does not undergo discoloration. The polyolefins are subject to attack by atmospheric oxygen which impairs the desirable properties thereof.

The present invention also is particularly applicable to the stabilization of lubricants, including lubricating oils and greases. These may be either of synthetic or petroleum origin. The synthetic lubricating oils are of varied types including aliphatic esters, polyalkylene oxides, silicones, esters of phosphoric and silicic acids, highly fluorine-substituted hydrocarbons, etc. Of the aliphatic esters, di-(2-ethylhexyl) sebacate is being used on a comparatively large commercial scale. Other aliphatic esters include dialkyl azelates, dialkyl suberates, dialkyl pimelates, dialkyl adipates, dialkyl glutarates, etc. Specific examples of these esters include dihexyl azelate, di-(2-ethylhexyl) azelate, di-3,5,5-trimethylhexyl glutarate, di-3,5,5-trimethylpentyl glutarate, di-(2-ethylhexyl) pimelate, di-(2-ethylhexyl) adipate, triamyl tricarballylate, pentaerythritol tetracaproate, pentaerythritol tetrapelargonate, dipropylene glycol dipelargonate, 1,5-pentanediol-di-(2-ethylhexanonate), etc. The polyalkylene oxides include polyisopropylene oxide, polyisopropylene oxide diether, polyisopropylene oxide diester, etc. The silicones include methyl silicone, ethylphenyl silicone, etc., and the silicates include, for example, tetraisooctyl silicate, etc. The highly fluorinated hydrocarbons include fluorinated oil, perfluorohydrocarbons, etc.

Additional synthetic lubricating oils include (1) neopentyl glycol esters, in which the ester group contains from 3 to 12 carbon atoms or more, and particularly neopentyl glycol propionate, neopentyl glycol butyrate, neopentyl glycol caproate, neopentyl glycol caprylate, neopentyl glycol pelargonate, etc., (2) trialkylol alkane esters such as the esters of trimethylol alkanes including trimethylolethane, trimethylolpropane, trimethylolbutane, trimethylolpentane, trimethylolhexane, trimethylolheptane, trimethyloloctane trimethylolnonane, trimethyloldecane, trimethylolundecane, trimethyloldodecane, etc., and particularly triesters in which the ester portions each contain from 3 to 12 carbon atoms and may be selected from those hereinbefore specifically set forth in connection with the discussion of the neopentyl glycol esters, and (3) tricresylphosphate, trioctylphosphate, trinonylphosphate, tridecylphosphate, triphenylphosphate, as well as mixed aryl and alkyl phosphates, etc.

The lubricating oils of petroleum origin include those referred to as motor lubricating oil, railroad type lubricating oil, marine oil, transformer oil, turbine oil, transmission oil, differential oil, diesel lubricating oil, gear oil, cutting oil, rolling oil, cylinder oil, hydraulic oil, slushing oil, specialty products oil, etc.

The synthetic greases generally are referred to as lithium base grease, sodium base grease, calcium base grease, barium base grease, strontium base grease, aluminum base grease, etc. These greases are solid or semi-solid gels and, in general, are prepared by the addition to mineral or synthetic oils of hydrocarbon-soluble metal soaps or salts of higher fatty acids as, for example, lithium stearate, calcium stearate, aluminum naphthenate, etc. The grease may contain thickening agents such as silica, carbon black, polyacrylates, talc, etc. Another type of grease is prepared from oxidized petroleum wax, to which the saponifiable base is combined with the proper amount of the desired saponifying agent, and the resultant mixture processed to produce a grease. Other types of greases in which the features of the present invention are usable include petroleum grease, whale grease, wool grease, etc., and those made from inedible fats, tallow, butcher's waste, etc.

The present invention also is applicable to the stabilization of fatty materials including the stabilization of edible fats and oils, which may be of animal, vegetable or mineral origin and which tend to become rancid, especially during long periods of storage prior to use. Typical representatives of edible fats and oils include linseed oil, menhaden oil, cod liver oil, castor oil, olive oil, rapeseed oil, coconut oil, palm oil, corn oil, sesame oil, peanut oil, butter, fat, lard, beef, etc. It is understood that other oils and fats may be treated within the scope of the present invention, including oils and fats which previously have been subjected to various treatments, such as blowing with air, heat treatment, hydrogenation, etc.

In another embodiment the present invention may be applied to the treatment of crops by dusting or spraying in order to preserve food accessory factors such as carotene, vitamins, various fatty acids, alcohols, etc.

Other organic substances which deteriorate in storage, during treatment and/or in use, include hydrocarbons and particularly motor fuels such as saturated and particularly unsaturated gasoline, blends of unsaturated and saturated gasolines, including cracked gasoline, straight run gasoline, polymer gasoline, coker gasoline, alkylate, etc., as well as jet fuel, diesel oil, mineral oil, fuel oil, residual oil, drying oil, waxes, resins, rubber which may be natural or synthetic, etc. These substances are adversely affected by oxygen, with the resultant formation of undesirable gum, discoloration and/or other deleterious reaction products.

In one embodiment the present invention relates to a method of stabilizing an organic substance normally subject to oxidative deterioration which comprises incorporating therein a stabilizing concentration of an inhibitor selected from the group consisting of alkylthioalkoxy and arylthioalkoxy substituted diphenylamines, diphenylalkanes, diphenylsulfides and diphenylethers.

In a specific embodiment the present invention relates to a method of stabilizing polyethylene against oxidative deterioration which comprises incorporating therein a stabilizing concentration of 4-ethylthioethoxydiphenylamine.

In another specific embodiment the present invention relates to a method of stabilizing lubricating grease against oxidative deterioration which comprises incorporating therein a stabilizing concentration of 4-ethylthioethoxy-4'-ethylthioethylaminodiphenylmethane.

In another embodiment the present invention relates to an organic substance, particularly polyolefin, lubricating oil and grease, containing a stabilizing concentration of an inhibitor as set forth herein.

The inhibitors of the present invention are believed to be novel compositions of matter and, accordingly, are also being so claimed in the present application.

The novel inhibitors in a preferred embodiment of the present invention may be illustrated by the following general formula:

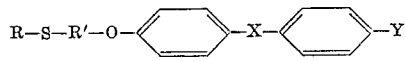

where R is an alkyl or aryl group, S is sulfur, R' is an alkylene radical, O is oxygen, X is selected from the group consisting of alkane, nitrogen, sulfur and oxygen, and Y is selected from the group consisting of hydrogen, alkyl, hydroxyl, alkylhydroxy, amino, alkylamino, alkylthioalkoxy, arylthioalkoxy, alkylthioalkylamino and arylthioalkylamino radicals.

Of the alkylthioalkoxydiphenylamines, a preferred inhibitor is 4-ethylthioethoxydiphenylamine. Other inhibitors include 4-methylthiomethoxydiphenylamine, 4-methylthioethoxydiphenylamine, 4-methylthiopropoxydiphenylamine, 4 - methylthiobutoxydiphenylamine, 4 - methylthiopentoxydiphenylamine, 4-methylthiohexoxydiphenylamine, 4-methylthioheptoxydiphenylamine, 4-methylthiooctoxydiphenylamine, etc., 4-ethylthiomethoxydiphenylamine, 4 - ethylthiopropoxydiphenylamine, 4-ethylthiobutoxydiphenylamine, 4 - ethylthiopentoxydiphenylamine, 4-ethylthiohexoxydiphenylamine, 4-ethylthioheptoxydiphenylamine, 4-ethylthiooctoxydiphenylamine, etc., 4-propylthiomethoxydiphenylamine, 4 - propylthioethoxydiphenylamine, 4-propylthiopropoxydiphenylamine, 4-propylthiobutoxydiphenylamine, 4-propylthiopentoxydiphenylamine, 4-propylthiohexoxydiphenylamine, 4-propylthioheptoxydiphenylamine, 4-propylthiooctoxydiphenylamine, etc., 4-butylthiomethoxydiphenylamine, 4-butylthioethoxydiphenylamine, 4-butylthiopropoxydiphenylamine, 4-butylthiobutoxydiphenylamine, 4-butylthiopentoxydiphenylamine, 4 - butylthiohexoxydiphenylamine, 4 - butylthioheptoxydiphenylamine, 4 - butylthiooctoxydiphenylamine, etc., 4-pentylthiomethoxydiphenylamine, 4 - pentylthioethoxydiphenylamine, 4-pentylthiopropoxydiphenylamine, 4-pentylthiobutoxydiphenylamine, 4 - pentylthiopentoxydiphenylamine, 4-pentylthiohexoxydiphenylamine, 4-pentylthioheptoxydiphenylamine, 4-pentylthiooctoxydiphenyl, etc., 4-hexylthiomethoxydiphenylamine, 4-hexylthioethoxydiphenylamine, 4-hexylthiopropoxydiphenylamine, 4-hexylthiobutoxydiphenylamine, 4 - hexylthiopentoxydiphenylamine, 4-hexylthiohexoxydiphenylamine, 4-hexylthioheptoxydiphenylamine, 4-hexylthiooctoxydiphenylamine, etc., 4-heptylthiomethoxydiphenylamine, 4-heptylthioethoxydiphenylamine, 4-heptylthiopropoxydiphenylamine, 4-heptylthiobutoxydiphenylamine, 4-heptylthiopentoxydiphenylamine, 4 - heptylthiohexoxydiphenylamine, 4 - heptylthioheptoxydiphenylamine, 4-heptylthiooctoxydiphenylamine, etc., 4-octylthiomethoxydiphenylamine, 4-octylthioethoxydiphenylamine, 4-octylthiopropoxydiphenylamine, 4-octylthiobutoxydiphenylamine, 4 - octylthiopentoxydiphenylamine, 4 - octylthiohexoxydiphenylamine, 4 - octylthioheptoxydiphenylamine, 4-octylthiooctoxydiphenylamine, etc.

In another embodiment, the alkyl and/or alkylene (alkoxy) groups in the general formula hereinbefore set forth may contain more than 8 carbon atoms each, and thus would be selected from nonyl, decyl, undecyl, dodecyl, tridecyl, tetradecyl, pentadecyl, hexadecyl, heptadecyl, octadecyl, nonadecyl, eicosyl, etc., or the corresponding alkylene (alkoxy) radicals.

In another embodiment the alkylthioalkoxydiphenylamines comprise 4,4'-bis-(alkylthioalkoxy) - diphenylamines. A preferred inhibitor in this embodiment is 4,4'-bis-(ethylthioethoxy)-diphenylamine. Other inhibitors include 4,4'-bis-(methylthiomethoxy)-diphenylamine,
4,4'-bis-(methylthioethoxy)-diphenylamine,
4,4'-bis-(methylthiopropoxy)-diphenylamine,
4,4'-bis-(methylthiobutoxy)-diphenylamine,
4,4'-bis-(methylthiopentoxy)-diphenylamine,
4,4'-bis-(methylthiohexoxy)-diphenylamine,
4,4'-bis-(methylthioheptoxy)-diphenylamine,
4,4'-bis-(methylthiooctoxy)-diphenylamine, etc.,
4,4'-bis-(ethylthiomethoxy)-diphenylamine,
4,4'-bis-(ethylthiopropoxy)-diphenylamine,
4,4'-bis-(ethylthiobutoxy)-diphenylamine,
4,4'-bis-(ethylthiopentoxy)-diphenylamine,
4,4'-bis-(ethylthiohexoxy)-diphenylamine,
4,4'-bis-(ethylthioheptoxy)-diphenylamine,
4,4'-bis-(ethylthiooctoxy)-diphenylamine, etc.,
4,4'-bis-(propylthiomethoxy)-diphenylamine,
4,4'-bis-(propylthioethoxy)-diphenylamine,
4,4'-bis-(propylthiopropoxy)-diphenylamine,
4,4'-bis-(propylthiobutoxy)-diphenylamine,
4,4'-bis-(propylthiopentoxy)-diphenylamine,
4,4'-bis-(propylthiohexoxy)-diphenylamine,
4,4'-bis-(propylthioheptoxy)-diphenylamine,
4,4'-bis-(propylthiooctoxy)-diphenylamine, etc.,
4,4'-bis-(butylthiomethoxy)-diphenylamine,
4,4'-bis-(butylthioethoxy)-diphenylamine,
4,4'-bis-(butylthiopropoxy)-diphenylamine,
4,4'-bis-(butylthiobutoxy)-diphenylamine,
4,4'-bis-(butylthiopentoxy)-diphenylamine,
4,4'-bis-(butylthiohexoxy)-diphenylamine,
4,4'-bis-(butylthioheptoxy)-diphenylamine,
4,4'-bis-(butylthiooctoxy)-diphenylamine, etc.,
4,4'-bis-(pentylthiomethoxy)-diphenylamine,
4,4'-bis-(pentylthioethoxy)-diphenylamine,
4,4'-bis-(pentylthiopropoxy)-diphenylamine,
4,4'-bis-(pentylthiobutoxy)-diphenylamine,
4,4'-bis-(pentylthiopentoxy)-diphenylamine,
4,4'-bis-(pentylthiohexoxy)-diphenylamine,
4,4'-bis-(pentylthioheptoxy)-diphenylamine,
4,4'-bis-(pentylthiooctoxy)-diphenylamine, etc.,
4,4'-bis-(hexylthiomethoxy)-diphenylamine,
4,4'-bis-(hexylthioethoxy)-diphenylamine,
4,4'-bis-(hexylthiopropoxy)-diphenylamine,
4,4'-bis-(hexylthiobutoxy)-diphenylamine,
4,4'-bis-(hexylthiopentoxy)-diphenylamine,
4,4'-bis-(hexylthiohexoxy)-diphenylamine,
4,4'-bis-(hexylthioheptoxy)-diphenylamine,
4,4'-bis-(hexylthiooctoxy)-diphenylamine, etc.,
4,4'-bis-(heptylthiomethoxy)-diphenylamine,
4,4'-bis-(heptylthioethoxy)-diphenylamine,
4,4'-bis-(heptylthiopropoxy)-diphenylamine,
4,4'-bis-(heptylthiobutoxy)-diphenylamine,
4,4'-bis-(heptylthiopentoxy)-diphenylamine,
4,4'-bis-(heptylthiohexoxy)-diphenylamine,
4,4'-bis-(heptylthioheptoxy)-diphenylamine,
4,4'-bis-(heptylthiooctoxy)-diphenylamine, etc.,
4,4'-bis-(octylthiomethoxy)-diphenylamine,
4,4'-bis-(octylthioethoxy)-diphenylamine,
4,4'-bis-(octylthiopropoxy)-diphenylamine,
4,4'-bis-(octylthiobutoxy)-diphenylamine,
4,4'-bis-(octylthiopentoxy)-diphenlamine,
4,4'-bis-(octylthiohexoxy)-diphenylamine ,
4,4'-bis-(octylthioheptoxy)-diphenylamine,
4,4'-bis-(octylthiooctoxy)-diphenylamine, etc.

Here again, it is understood that the alkyl and/or alkylene (alkoxy) group may contain a higher number of carbon atoms which generally will not be more than about 20 carbon atoms each.

When Y in the above general formula is an alkyl group, the alkyl group may contain from 1 to 20 or more carbon atoms and preferably is selected from the alkyl groups hereinbefore specifically set forth. A few illustrative compounds in this embodiment of the invention include 4-ethylthioethoxy-4'-methyldiphenylamine,
4-ethylthioethoxy-4'-ethyldiphenylamine,
4-ethylthioethoxy-4'-propyldiphenylamine,
4-ethylthioethoxy-4'-butyldiphenylamine,
4-ethylthioethoxy-4'-pentyldiphenylamine,
4-ethylthioethoxy-4'-hexyldiphenylamine,
4-ethylthioethoxy-4'-heptyldiphenylamine,
4-ethylthioethoxy-4'-octyldiphenylamine, etc.

and other compounds in which the alkylthioalkoxy group is different and is selected from those hereinbefore set forth and/or compounds in which the Y radical is an alkyl group of from 9 to 20 or more carbon atoms.

When Y in the above general formula is a hydroxyl group, a few illustrative compounds include 4-ethylthioethoxy-4'-hydroxydiphenylamine,
4-ethylthiomethoxy-4'-hydroxydiphenylamine,
4-ethylthiopropoxy-4'-hydroxydiphenylamine,
4-ethylthiobutoxy-4'-hydroxydiphenylamine, etc.,
4-methylthiomethoxy-4'-hydroxydiphenylamine,
4-methylthioethoxy-4'-hydroxydiphenylamine,
4-methylthiopropoxy-4'-hydroxydiphenylamine,
4-methylthiobutoxy-4'-hydroxydiphenylamine, etc.,
4-propylthiopropoxy-4'-hydroxydiphenylamine,
4-propylthiobutoxy-4'-hydroxydiphenylamine, etc.

Here again the alkylthioalkoxy group may be different from those specifically recited in the above illustrative compounds and will be selected from those specifically set forth in the earlier discussion of alkylthioalkyl diphenylamines.

When Y in the above shown formula is a hydroxyalkyl group, a few illustrative compounds include 4-methylthioethoxy-4'-hydroxymethyldiphenylamine,
4-ethylthiomethoxy-4'-hydroxymethyldiphenylamine,
4-methylthioethoxy-4'-hydroxymethyldiphenylamine,
4-ethylthioethoxy-4'-hydroxyethyldiphenylamine,
4-propylthiopropoxy-4'-hydroxypropyldiphenylamine,
4-butylthiobutoxy-4'-hydroxybutyldiphenylamine, etc.

It is understood that the alkyl and/or alkoxy groups may vary and will be selected from those hereinbefore specifically set forth in the present specifications.

When Y in the above general formula is amino, a few illustrative compounds include 4-ethylthioethoxy-4'-aminodiphenylamine,
4-ethylthiomethoxy-4'-aminodiphenylamine,
4-ethylthiopropoxy-4'-aminodiphenylamine,
4-ethylthiobutoxy-4'-aminodiphenylamine, etc.,
4-methylthiomethoxy-4'-aminodiphenylamine,
4-methylthioethoxy-4'-aminodiphenylamine,
4-methylthiopropoxy-4'-aminodiphenylamine,
4-methylthiobutoxy-4'-aminodiphenylamine, etc.,
4-propylthiopropoxy-4'-aminodiphenylamine,
4-propylthiobutoxy-4'-aminophenylamine, etc.

Here again other compounds contain an alkylthioalkoxy group selected from those hereinbefore set forth.

When Y in the above shown formula is alkylamino, a few illustrative compounds include 4-methylthiomethoxy-4'-methylaminodiphenylamine,
4-ethylthiomethoxy-4'-methylaminodiphenylamine,
4-ethylthioethoxy-4'-methylaminodphenylamine,
4-ethylthioethoxy-4'-ethylaminodiphenylamine,
4-propylthiopropoxy-4'-propylaminodiphenylamine,
4-butylthiobutoxy-4'-butylaminodiphenylamine, etc.

Again, it is understood that these are illustrative examples only, and that the alkyl and/or alkoxy groups may be varied and preferably will be selected from those hereinbefore specifically set forth in the present specifications.

When Y in the above general formula is alkylthioalkylamino, a few illustrative compounds include 4-ethylthioethoxy-4'-ethylthioethylaminodiphenylamine,
4-ethylthiomethoxy-4'-ethylthiomethylaminodiphenylamine,
4-ethylthiopropoxy-4'-ethylthiopropylaminodiphenylamine,
4-ethylthiobutoxy-4'-ethylthiobutylaminodiphenylamine, etc.,
4-methylthiomethoxy-4'-methylthiomethylaminodiphenylamine,
4-propylthiopropoxy-4'-propylthiopropylaminodiphenylamine,
4-butylthiobutoxy-4'-butylthiobutylaminodiphenylamine, etc.

Here again it is understood that these are merely illustrative examples and that other alkyl and/or alkylene (alkoxy) groups are comprised within the present invention, the other alkyl and/or alkylene (alkoxy) groups being selected from those hereinbefore specifically set forth.

Of the alkylthioalkoxydiphenylalkanes, preferred inhibitors are 4-ethylthioethoxydiphenylmethane and 4,4'-bis - (ethylthioethoxy) - diphenylmethane. Other compounds in this embodiment include alkylthioalkoxy and bis - (alkylthioalkoxy) - diphenylalkanes containing the specific substituents hereinbefore recited in the description of the alkylthioalkoxy and bis-(alkylthioalkoxy)-diphenylamines, and all such correspondingly substituted mono- and di-alkylthioalkoxy substituted diphenylalkanes are specifically included in the present invention. It would unnecessarily encumber the present specifications to repeat all of these specific compounds when their identities are readily ascertained by substituting diphenylmethane, diphenylethane, diphenylpropane, diphenylbutane, diphenylpentane, diphenylhexane, diphenylheptane, diphenyloctane, etc. for diphenylamine in the compounds specifically recited hereinbefore. In the interest of brevity, only a few such compounds are recited below with the clear understanding that these are merely illustrative and not limiting. These illustrative compounds include 4-methylthiomethoxydiphenylmethane,
4-methylthioethoxydiphenylmethane,
4-methylthiopropoxydiphenylmethane,
4-methylthiobutoxydiphenylmethane, etc.,
4-ethylthiomethoxydiphenylmethane,
4-ethylthiopropoxydiphenylmethane,
4-ethylthiobutoxydiphenylmethane, etc.,
4-propylthiomethoxydiphenylmethane,
4-propylthioethoxydiphenylmethane,
4-propylthiopropoxydiphenylmethane,
4-propylthiobutoxydiphenylmethane, etc.,
4-butylthiomethoxydiphenylmethane,
4-butylthioethoxydiphenylmethane,
4-butylthiopropoxydiphenylmethane,
4-butylthiobutoxydiphenylmethane, etc.,
4,4'-bis-(methylthiomethoxy)-diphenylmethane,
4,4'-bis-(methylthioethoxy)-diphenylmethane,
4,4'-bis-(methylthiopropoxy)-diphenylmethane,
4,4'-bis-(methylthiobutoxy)-diphenylmethane, etc.,
4,4'-bis-(ethylthiomethoxy)-diphenylmethane,
4,4'-bis-(ethylthiopropoxy)-diphenylmethane,
4,4'-bis-(ethylthiobutoxy)-diphenylmethane, etc.,
4,4'-bis-(propylthiomethoxy)-diphenylmethane,
4,4'-bis-(propylthioethoxy)-diphenylmethane,
4,4'-bis-(propylthiopropoxy)-diphenylmethane,
4,4'-bis-(propylthiobutoxy)-diphenylmethane, etc.,
4,4'-bis-(butylthiomethoxy)-diphenylmethane,
4,4'-bis-(butylthioethoxy)-diphenylmethane,
4,4'-bis-(butylthiopropoxy)-diphenylmethane,
4,4-bis-(butylthiobutoxy)-diphenylmethane, etc.,
4-methylthiomethoxydiphenylethane,
4-methylthioethoxydiphenylethane, 4-methylthiopropoxydiphenylethane,
4-methylthiobutoxydiphenylethane, etc.,
4-ethylthiomethoxydiphenylethane,
4-ethylthioethoxydiphenylethane,
4-ethylthiopropoxydiphenylethane,
4-ethylthiobutoxydiphenylethane, etc.,
4-propylthiomethoxydiphenylethane,
4-propylthioethoxydiphenylethane,
4-propylthiopropoxydiphenylethane,
4-propylthiobutoxydiphenylethane, etc.,
4-butylthiomethoxydiphenylethane,
4-butylthioethoxydiphenylethane,
4-butylthiopropoxydiphenylethane,
4-butylthiobutoxydiphenylethane, etc.,
4,4'-bis-(methylthiomethoxy)-diphenylethane,
4,4'-bis-(methylthioethoxy)-diphenylethane,
4,4'-bis-(methylthiopropoxy)-diphenylethane,
4,4'-bis-(methylthiobutoxy)-diphenylethane, etc.,
4,4'-bis-(ethylthiomethoxy)-diphenylethane,
4,4'-bis-(ethylthioethoxy)-diphenylethane,
4,4'-bis-(ethylthiopropoxy)-diphenylethane,
4,4'-bis-(ethylthiobutoxy)-diphenylethane, etc.,
4,4'-bis-(propylthiomethoxy)-diphenylethane,
4,4'-bis-(propylthioethoxy)-diphenylethane,
4,4'-bis-(propylthiopropoxy)-diphenylethane,
4,4'-bis-(propylthiobutoxy)-diphenylethane, etc.,
4,4'-bis-(butylthiomethoxy)-diphenylethane,
4,4'-bis-(butylthioethoxy)-diphenylethane,
4,4'-bis-(butylthiopropoxy)-diphenylethane,
4,4'-bis-(butylthiobutoxy)-diphenylethane, etc.,
4-methylthiomethoxydiphenylpropane,
4-methylthioethoxydiphenylpropane,
4-methylthiopropoxydiphenylpropane,
4-methylthiobutoxydiphenylpropane, etc.,
4-ethylthiomethoxydiphenylpropane,
4-ethylthioethoxydiphenylpropane,
4-ethylthiopropoxydiphenylpropane,
4-ethylthiobutoxydiphenylpropane, etc.,
4-propylthiomethoxydiphenylpropane,
4-proplythioethoxydiphenylpropane,
4-propylthiopropoxydiphenylpropane,
4-propylthiobutoxydiphenylpropane, etc.,
4-butylthiomethoxydiphenylpropane,
4-butylthioethoxydiphenylpropane,
4-butylthiopropoxydiphenylpropane,
4-butylthiobutoxydiphenylpropane, etc.,
4,4'-bis-(methylthiomethoxy)-diphenylpropane,
4,4'-bis(methylthioethoxy)-diphenylpropane,
4,4'-bis-(methylthiopropoxy)-diphenylpropane,
4,4'-bis-(methylthiobutoxy)-diphenylpropane, etc.,
4,4'-bis-(ethylthiomethoxy)-diphenylpropane,
4,4'-bis-(ethylthioethoxy-diphenylpropane,
4,4'-bis-(ethylthiopropoxy)-diphenylpropane,
4,4'-bis-(ethylthiobutoxy)-diphenylpropane, etc.,
4,4'-bis-(propylthiomethoxy)-diphenylpropane,
4,4'-bis-(propylthioethoxy)-diphenylpropane,
4,4'-bis-(propylthiopropoxy)-diphenylpropane,
4,4'-bis-(propylthiobutoxy)-diphenylpropane, etc.,
4,4'-bis-(butylthiomethoxy)-diphenylpropane,
4,4'-bis-(butylthioethoxy)-diphenylpropane,
4,4'-bis-(butylthiopropoxy)-diphenylpropane,
4,4'-bis-(butylthiobutoxy)-diphenylpropane, etc.,
4-methylthiomethoxydiphenylbutane,
4-methylthioethoxydiphenylbutane,
4-methylthiopropoxydiphenylbutane,
4-methylthiobutoxydiphenylbutane, etc.,
4-ethylthiomethoxydiphenylbutane,
4-ethylthioethoxydiphenylbutane,
4-ethylthiopropoxydiphenylbutane,
4-ethylthiobutoxydiphenylbutane, etc.,
4-propylthiomethoxyldiphenylbutane,
4-propylthioethoxydiphenylbutane,
4-propylthiopropoxydiphenylbutane,
4-propylthiobutoxydiphenylbutane, etc.,
4-butylthiomethoxydiphenylbutane,
4-butylthioethoxydiphenylbutane,
4-butylthiopropoxydiphenylbutane,
4-butylthiobutoxydiphenylbutane, etc.,
4,4'-bis-(methylthiomethoxy)-diphenylbutane,
4,4'-bis-(methylthioethoxy)-diphenylbutane,
4,4'-bis-(methylthiopropoxy)-diphenylbutane,
4,4'-bis-(methylthiobutoxy)-diphenylbutane, etc.,
4,4'-bis-(ethylthiomethoxy)-diphenylbutane,
4,4'-bis-(ethylthioethoxy)-diphenylbutane,
4,4'-bis-(ethylthiopropoxy)-diphenylbutane,
4,4'-bis-(ethylthiobutoxy)-diphenylbutane, etc.,
4,4'-bis-(propylthiomethoxy)-diphenylbutane,
4,4'-bis-(propylthioethoxy)-diphenylbutane,
4,4'-bis-(propylthiopropoxy)-diphenylbutane,
4,4'-bis-(propylthiobutoxy)-diphenylbutane, etc.,
4,4'-bis-(butylthiomethoxy)-diphenylbutane,
4,4'-bis-(butylthioethoxy)-diphenylbutane,
4,4'-bis-(butylthiopropoxy)-diphenylbutane,
4,4'-bis-(butylthiobutoxy)-diphenylbutane, etc.

Here again, it is understood that higher molecular weight alkyl and/or alkylene (alkoxy) groups are usable as described in connection with the substituted diphenylamines. Also, when Y is alkyl, illustrative compounds include 4-ethylthioethoxy-4'-methyl-diphenylmethane,
4-ethylthioethoxy-4'-ethyldiphenylmethane,
4-ethylthioethoxy-4'-propyldiphenylmethane,
4-ethylthioethoxy-4'-butyldiphenylmethane, etc.,
4-methylthiomethoxy-4'-methyldiphenylethane,
4-ethylthioethoxy-4'-ethyldiphenylethane,
4-propylthiopropoxy-4'-propyldiphenylethane,
4-propylthiopropoxy-4'-propyldiphenylpropane,
4-propylthiopropoxy-4'-propyldiphenylbutane,
4-butylthiobutoxy-4'-butyldiphenylbutane,
4-hexylthioethoxy-4'-octyldiphenylbutane,
4-hexylthioethoxy-4'-octyldiphenylhexane, etc.

When Y is hydroxyl, a few illustrative compounds include 4-methylthiomethoxy-4'-hydroxydiphenylmethane,
4-ethylthioethoxy-4'-hydroxydiphenylethane,
4-propylthiopropoxy-4'-hydroxydiphenylpropane,
4-butylthiobutoxy-4'-hydroxydiphenylbutane, etc.,
4-methylthiomethoxy-4'-hydroxymethyldiphenylmethane,
4-ethylthioethoxy-4'-hydroxyethyldiphenylethane,
4-propylthiopropoxy-4'-hydroxypropyldiphenylpropane,
4-butylthiobutoxy-4'-hydroxybutyldiphenylbutane, etc.

When Y is amino, a few illustrative compounds include 4-methylthiomethoxy-4'-aminodiphenylmethane,
4-ethylthioethoxy-4'-aminodiphenylethane,
4-propylthiopropoxy-4'-aminodiphenylpropane,
4-butylthiobutoxy-4'-aminodiphenylbutane, etc.,
4-methylthiomethoxy-4'-hydroxymethyldiphenylmethane,
4-ethylthioethoxy-4'-hydroxyethyldiphenylethane,
4-propylthiopropoxy-4'-hydroxypropyldiphenylpropane,
4-butylthiobutoxy-4'-hydroxybutyldiphenylbutane, etc.

When Y is alkylthioalkylamino, a few illustrative compounds include 4-methylthiomethoxy-4'-methylthiomethylaminodiphenylmethane,
4-ethylthioethoxy-4'-ethylthioethylaminodiphenylethane,
4-propylthiopropoxy-4'-propylthiopropylaminodiphenylpropane,
4-butylthiobutoxy-4'-butylthiobutylaminodiphenylbutane, etc.

Here again, it is understood that the alkyl and/or alkylene (alkoxy) groups may contain a higher number of carbon atoms per group, and that these preferably are selected from those hereinbefore specifically set forth.

Of the alkylthioalkoxydiphenylsulfides, preferred inhibitors are 4-ethylthioethoxydiphenylsulfide and 4,4'-bis-(ethylthioethoxy)-diphenylsulfide. Other compounds in this embodiment include alkylthioalkoxy substituted diphenylsulfides containing the specific substituents hereinbefore recited in the description of the alkylthioalkoxy substituted diphenylamines, and all such correspondingly substituted alkythioalkoxydiphenylsulfides are specifically included in the present invention. As mentioned previously, it would unnecessarily encumber the present specifications to repeat all the specific compounds when their identities are readily ascertained by substituting diphenylsulfide for diphenylamine in the compounds specifically recited hereinbefore. Merely for illustrative purposes, the following few of such compounds are specifically set forth as 4-methylthiomethoxydiphenylsulfide,
4-ethylthiomethoxydiphenylsulfide,
4-methylthioethoxydiphenylsulfide,
4-propylthioethoxydiphenylsulfide,
4-propylthioproxydiphenylsulfide,
4-butylthiobutoxydiphenylsulfide, etc.,
4,4'-bis-(methylthiomethoxy)-diphenylsulfide,
4,4'-bis-(ethylthiomethoxy)-diphenylsulfide,
4,4'-bis-(methylthioethoxy)-diphenylsulfide,
4,4'-bis-(propylthioethoxy)-diphenylsulfide,
4,4'-bis-(propylthiopropoxy)-diphenylsulfide,
4,4'-bis-(butylthiobutoxy)-diphenylsulfide, etc.,
4-methylthiomethoxy-4'-methyldiphenylsulfide,
4-ethylthioethoxy-4'-ethyldiphenylsulfide,
4-propythiopropoxy-4'-propyldiphenylsulfide,
4-butylthiobutoxy-4'-butyldiphenylsulfide, etc.,
4-methylthiomethoxy-4'-hydroxydiphenylsulfide,
4-ethylthioethoxy-4'-hydroxydiphenylsulfide,
4-propylthiopropoxy-4'-hydroxydiphenylsulfide,
4-butylthiobutoxy-4'-hydroxydiphenylsulfide, etc.,
4-methylthiomethoxy-4'-hydroxymethyldiphenylsulfide,
4-ethylthioethoxy-4'-hydroxyethyldiphenylsulfide,
4-propylthioproxy-4'-hydroxypropyldiphenylsulfide,
4-butylthiobutoxy-4'-hydroxybutyldiphenylsulfide, etc.,
4-methylthiomethoxy-4'-aminodiphenylsulfide,
4-ethylthioethoxy-4'-aminodiphenylsulfide,
4-propylthiopropoxy-4'-aminodiphenylsulfide,
4-butylthiobutoxy-4'-aminodiphenylsulfide, etc.,
4-methylthiomethoxy-4'-methylaminodiphenylsulfide,
4-ethylthioethoxy-4'-ethylaminodiphenylsulfide,
4-propylthiopropoxy-4'-propylaminodiphenylsulfide,
4-butylthiobutoxy-4'-butylaminodiphenylsulfide, etc.,
4-methylthiomethoxy-4'-methylthiomethylaminodiphenylsulfide,
4-ethylthioethoxy-4'-ethylthioethylaminodiphenylsulfide,
4-propylthioproxy-4'-propylthiopropylaminodiphenlysulfide,
4-butylthiobutoxy-4'-butylthiobutylaminodiphenylsulfide, etc.

Here again, it is understood that higher molecular weight alkyl and/or alkylene (alkoxy) groups are usable as hereinbefore set forth.

Of the alkylthioalkoxy substituted diphenylethers, preferred inhibitors are 4-ethylthioethoxydiphenylether and 4,4'-bis-(ethylthioethoxy)-diphenylether. Other compounds in this embodiment include alkylthioalkoxy substituted diphenylethers containing the specific substituents hereinbefore recited in the description of the alkylthioalkoxy substituted diphenylamines, and all such correspondingly substituted alkylthioalkoxydiphenylethers are specifically included in the present invention. As mentioned previously, it would unnecessarily encumber the present specifications to repeat all the specific compounds when their identities are readily ascertained by substituting diphenylether for diphenylamine in the compounds specifically recited hereinbefore. Merely for illustrative purposes, the following few of such compounds are specifically set forth as 4-methylthiomethoxydiphenylether,
4-ethylmethiomethoxydiphenylether,
4-methylthioethoxydiphenylether,
4-propylthioethoxydiphenylether,
4-propylthiopropoxydiphenylether,
4-butylthiobutoxydiphenylether, etc.,
4,4'-bis-(methylthiomethoxy)-diphenylether,
4,4'-bis-(ethylthiomethoxy)-diphenylether,
4,4'-bis-(methylthioethoxy)-diphenylether,
4,4'-bis(propylthioethoxy)-diphenylether,
4,4'-bis-(propylthiopropoxy)-diphenylether,
4,4'-bis-(butylthiobutoxy)-diphenylether, etc.,
4-methylthiomethoxy-4'-methyldiphenylether,
4-ethylthioethoxy-4'-ethyldiphenylether,
4-propylthiopropoxy-4'-propyldiphenylether,
4-butylthiobutoxy-4'butyldiphenylether, etc.,
4-methylthiomethoxy-4'-hydroxydiphenylether,
4-ethylthioethoxy-4'-hydroxydiphenylether,
4-propylthiopropoxy-4'-hydroxydiphenylether,
4-butylthiobutoxy-4'-butyldiphenylether, etc.,
4-methylthiomethoxy-4'-hydroxymethyldiphenylether,
4-ethylthioethoxy-4'-hydroxyethyldiphenylether,
4-propylthiopropoxy-4'-hydroxypropyldiphenylether,
4-butylthiobutoxy-4'-hydroxybutyldiphenylether, etc.,
4-methylthiomethoxy-4'-aminodiphenylether,
4-ethylthioethoxy-4'-aminodiphenylether,
4-propylthiopropoxy-4'-aminodiphenylether,
4-butylthiobutoxy-4'-aminodiphenlyether, etc.,
4-methylthiomethoxy-4'-methylaminodiphenylether,
4-ethylthioethoxy-4'-ethylaminodiphenylether,
4-propylthiopropoxy-4'-propylaminodiphenylether,
4-butylthiobutoxy-4'-butylaminodiphenylether, etc.,
4-methylthiomethoxy-4'-methylthiomethylaminodiphenylether,
4-ethylthioethoxy-4'-ethylthioethylaminodiphenylether,
4-propylthiopropoxy-4'-propylthiopropylaminodiphenylether,
4-butylthiobutoxy-4'-butylthiobutylaminodiphenylether, etc.

In general, the 4- or the 4,4'-alkylthioalkoxy diphenylamines, diphenylalkanes, diphenylsulfides and diphenylethers are preferred. However, in another embodiment of the invention, these substitutions may be in the 2,2,2' or in the 2,4' positions and it is clearly understood that such compounds are comprised within the present invention. These specific compounds are readily identified by substituting "2" for one or both of the number "4" in the compounds hereinbefore set forth.

As hereinbefore set forth in another embodiment of the invention, the compounds contain an arylthioalkoxy substitution. Illustrative compounds in this embodiment include 4-phenylthiomethoxydiphenylamine,
4-phenylthioethoxydiphenylamine,
4-phenylthiopropoxydiphenylamine,
4-phenylthiobutoxydiphenylamine, etc.,
4-tolylthiomethoxydiphenylamine,
4-tolylthioethoxydiphenylamine,
4-tolylthiopropoxydiphenylamine,
4-tolylthiobutoxydiphenylamine, etc.,
4-xylylthiomethoxydiphenylamine,
4-xylylthioethoxydiphenylamine,
4-xylylthiopropoxydiphenylamine,
4-xylylthiobutoxydiphenylamine, etc.,
4-phenylthiomethoxy-4'-methyldiphenylamine,
4-phenylthioethoxy-4'-ethyldiphenylamine,
4-tolylthiomethoxy-4'-methyldiphenylamine,
4-tolylthioethoxy-4'-ethyldiphenylamine,
4-xylylthiomethoxy-4'-methyldiphenylamine,
4-xylylthioethoxy-4'-ethyldiphenylamine, etc.,
4-phenylthiomethoxy-4'-hydroxymethyldiphenylamine,
4-phenylthioethoxy-4'-hydroxyethyldiphenylamine,
4-tolylthiomethoxy-4'-hydroxyethyldiphenylamine,
4-tolylthioethoxy-4'-hydroxypropyldiphenylamine,
4-xylylthiomethoxy-4'-hydroxypropyldiphenylamine,
4-xylylthioethoxy-4'-hydroxybutyldiphenylamine, etc.,
4-phenylthiomethoxy-4'-aminodiphenylamine,
4-tolylthiomethoxy-4'-aminodiphenylamine, 4-xylylthiomethoxy-4'-aminodiphenylamine, etc.,
4-phenylthiomethoxy-4'-methylaminodiphenylamine,
4-phenylthioethoxy-4'-ethylaminodiphenylamine,
4-tolylthioethoxy-4'-ethylaminodiphenylamine,
4-tolylthiopropoxy-4'-propylaminodiphenylamine,
4-xylylthiopropoxy-4'-propylaminodiphenylamine,
4-xylylthiobutoxy-4'-butylaminodiphenylamine, etc.,
4-phenylthiomethoxy-4'-phenylthiomethylaminodiphenylamine,
4-phenylthioethoxy-4'-phenylthioethylaminodiphenylamine,
4-tolylthioethoxy-4'-phenylthioethylaminodiphenylamine,
4-tolylthiopropoxy-4'-tolylthiopropylaminodiphenylamine,
4-xylylthiopropoxy-4'-phenylthiopropylaminodiphenylamine,
4-xylylthiobutoxy-4'-xylylthiobutylaminodiphenylamine, etc.,
4,4'-bis-(phenylthiomethoxy)-diphenylamine,
4,4'-bis-(phenylthioethoxy)-diphenylamine,
4,4'-bis-(tolylthioethoxy)-diphenylamine,
4,4'-bis-(tolylthiopropoxy)-diphenylamine,
4,4'-bis-(xylylthiopropoxy)-diphenylamine,
4,4'-bis-(xylylthiobutoxy)-diphenylamine, etc.

Again it is understood that the alkyl and/or alkylene (alkoxy) groups may be varied and preferably are selected from those hereinbefore specifically set forth in the present specifications. The aryl group also may be varied and either will comprise phenyl, tolyl or xylyl as illustrated in the above compounds, or is selected from other aryl groups including, for example, ethylphenyl, propylphenyl, butylphenyl, hexylphenyl, heptylphenyl, octylphenyl, etc., naphthyl, alkylnaphthyl, etc. Also, it is understood that these compounds may be in the 2,2,2'- or 2,4'-positions.

From the description hereinbefore set forth, it will be seen that a number of different compounds are used in accordance with the present invention. However, it is understood that all of these compounds are not necessarily equivalent in their activity in a particular organic substance. However, all of these compounds containing the alkylthioalkoxy or arylthioalkoxy diphenyl compound configuration will be effective in retarding oxidation of organic substances. Also, it is understood that a mixture of these inhibitors may be used.

The inhibitors of the present invention may be prepared in any suitable manner. The preparations of a number of these inhibitors are set forth in the examples appended to the present specifications. It is understood that other alkylthioalkoxy or arylthioalkoxy substituted compounds may be prepared by the same general methods.

In general, the inhibitor of the present invention is used in the organic substance in a concentration of from about 0.0001% to about 5% by weight of the organic substance, although in some cases higher or lower concentrations may be employed. The exact concentration to be used will depend upon the particular organic substance being treated. In most cases, concentrations of from about 0.01% to about 2% by weight generally will be employed.

It is understood that the inhibitor of the present invention may be used along with other additives incorporated in the organic substance. For example, in grease the inhibitor may be used along with higher alcohols, esters, organic amines, polybutene, sulfurized fatty materials, sulfur chlorine compounds, molybdenum disulfide, dyes, perfumed materials, fillers, etc. In lubricating oil, the inhibitor may be used along with one or more of the above additives and/or viscosity index improver, pour-point depressor, anti-forming agent, detergent, lubricity or extreme pressure additive, etc. In polymers, such as polyolefins, the inhibitor is used along with one or more of dyes and/or pigments, anti-static agents, plasticizers, ultraviolet light stabilizers, etc. In some cases, it may be of advantage to also include a metal deactivator as, for example, disalicylal diamino propane, ethylene diamine tetraacetic acid tetrasodium salt, etc., or to include other additives such as tricresyl phosphate, trialkyl phenols including 2,6-di-tert-butyl-4-methylphenol, 2,4-dimethyl-6-tert-butylphenoyl, alkylated diphenyl amines, phenyl naphthyl amines, dialkyl phenylene diamines, phenothiazine, organic selenium compounds, etc. When desired, the inhibitor of the present invention may be prepared as a mixture with one or more of these other additives and incorporated in this manner in the organic substance.

Also, it is understood that the inhibitor of the present invention may be prepared as a solution in a suitable solvent including hydrocarbons, alcohols, ketones, etc. In some cases, the same solvent used for the inhibitor of the present invention may be used for one or more of the other additives to be incorporated in the organic substance. In another method, the inhibitor of the present invention may be prepared as a stock solution in a small quantity of the organic substance and the stock solution then is incorporated into the major quantity of the organic substance.

The inhibitor of the present invention may be incorporated in the organic substance in any suitable manner and at any suitable stage of preparation. For example, in an organic substance which comprises a mixture of several components as, for example, grease, the inhibitor may be added to one or more of the components of the grease prior to compositing and processing thereof, or it may be added to the mix at any time, preferably before final processing in order to obtain intimate mixing and dissolving of the inhibitor in the grease.

The following examples are introduced to illustrate further the novelty and utility of the present invention, but not with the intention of unduly limiting the same.

EXAMPLE I

The inhibitor of this example is 4-ethylthioethoxy-diphenylamine and was prepared as follows: 93 g. (0.5 mol) of 4-hydroxydiphenylamine were dissolved in 400 cc. of ethyl alcohol containing 20 g. (0.5 mol) of sodium hydroxide. The solution was heated to reflux and 65 g. (0.5 mol) of $\beta$-chloroethyl ethylsulfide were added slowly while stirring mechanically. Heating and stirring was continued for 2 hours, following which the mixture was cooled, the sodium chloride salt was removed by filteration, the solvent evaporated and the product distilled. 4-ethylthioethoxydiphenylamine was recovered as a liquid having a boiling point of 187–190° C. at 0.1 mm. Calculated: 70.29% carbon and 7.01% hydrogen. Found: 70.38% carbon and 6.95% hydrogen.

EXAMPLE II 4,4'-bis-(ethylthioethoxy)-diphenylamine is prepared in substantially the same manner as described in Example I, except that 4,4'-dihydroxydiphenylamine, 2 mol proportions of $\beta$-chloroethyl ethylsulfide and 2 mol proportions of sodium hydroxide are employed. The heating and stirring in this preparation is continued for 8 hours in order to insure completion of the reaction.

EXAMPLE III 2,4'-bis-(propylthioethoxy)-diphenylamine is prepared by refluxing 1 mol proportion of 2,4'-dihydroxydiphenylamine, 2 mol proportions of $\beta$-chloroethyl propylsulfide, 2 mol proportions of sodium hydroxide and absolute (ethyl) alcohol solvent. The refluxing is continued for 10 hours, after which the sodium chloride is removed by filtration, the alcohol solvent is removed by evaporation and the product is recovered as a distillation residue.

EXAMPLE IV

4 - methylthioethoxy - 4' - methylthioethylaminodiphenylmethane is prepared by refluxing 1 mol proportion of 4-hydroxy-4'-aminodihpenylmethane, 2 mol proportions of $\beta$-chloroethyl methylsulfide, 2 mol proportions of potassium hydroxide and ethyl alcohol. The refluxing is continued for 10 hours, after which the product is cooled, potassium chloride is removed by filtration, alcohol solvent is removed by evaporation and the product is recovered by distillation.

EXAMPLE V 4-ethylthiomethyoxydiphenylmethane is prepared by reacting equal mol proportions of 4-hydroxydiphenylmethane, β-chloroethyl methylsulfide and potassium hydroxide in the presence of dimethyl sulfoxide solvent. The reaction is effected by stirring at room temperature for 12 hours, after which the potassium chloride is removed by filtration, the solvent is removed by evaporation, and 4-ethylthiomethyldiphenylmethane is recovered as a distillation product.

EXAMPLE VI 2-butylthiomethoxydiphenylethane is prepared by reacting equal mol proportions of 2-hydroxydiphenylethane, chloromethyl butylsulfide and potassium hydroxide in the presence of absolute alcohol solvent. The reaction mixture is refluxed for 6 hours, after which the product is cooled, potassium chloride is removed by filtration, alcohol solvent is removed by evaporation and the product is recovered by distillation.

EXAMPLE VII 4,4'-bis-(ethylthioethoxy)-diphenylpropane is prepared by reacting 1 mol proportion of 4,4'-dihydroxydiphenylpropane, 2 mol proportions of β-chloroethyl ethylsulfide and 2 mol proportions of sodium hydroxide in the presence of absolute alcohol. Following completion of the reaction, the product is cooled, sodium chloride is removed by filtration, alcohol solvent is removed by evaporation and the product is recovered as a distillation residue.

EXAMPLE VIII 4-hexylthiopropoxydiphenylsulfide is prepared by reacting equal mol proportions of 4-hydroxydiphenylsulfide, γ-chloropropyl hexylsulfide and potassium hydroxide in the presence of absolute alcohol solvent. The reaction is effected under refluxing conditions for 6 hours, following which the product is cooled, potassium chloride is removed by filtration, alcohol solvent is removed by evaporation and the product is recovered by distillation.

EXAMPLE IX 4,4'-bis-(ethylthioethoxy)-diphenylsulfide is prepared by reacting 1 mol proportion of 4,4'-dihydroxydiphenylsulfide, 2 mol proportions of β-chloroethyl ethylsulfide and 2 mol proportions of potassium hydroxide in the presence of absolute alcohol solvent. The reaction mixture is refluxed for 6 hours, after which the reaction mixture is cooled, the potassium chloride is removed by filtration, the alcohol solvent is removed by evaporation and the product is recovered by distillation.

EXAMPLE X 4-ethylthioethoxydiphenylether is prepared by reacting 1 mol proportion of 4-hydroxydiphenylether, 1 mol proportion of β-chloroethyl ethylsulfide and 1 mol proportion of sodium hydroxide in the presence of isopropyl alcohol solvent. The reaction is effected by refluxing the mixture for 5 hours, following which the reaction mixture is allowed to cool, the sodium chloride is removed by filtration, the alcohol solvent is removed by evaporation and the product is recovered by distillation.

EXAMPLE XI 2-propylthiomethoxy-4'-aminodiphenylether is prepared by reacting 1 mol proportion of 2-hydroxy-4'-aminodiphenylether, 2 mol proportions chloromethyl propylsulfide and 2 mol proportions of potassium hydroxide in the presence of butyl alcohol solvent. The reaction mixture is refluxed for 16 hours and then the reaction mixture is allowed to cool. Potassium chloride is removed by filtration, the alcohol is removed by evaporation and the product is recovered by distillation.

EXAMPLE XII 4-ethylthioethoxydiphenylamine, prepared as described in Example I, was evaluated as an antioxidant in polyethylene. The polyethylene used in this example is of high density and is marketed under the trade name of "Fortiflex" by the Celanese Corporation of America. In the sample containing inhibitor, the inhibitor was used in a concentration of 0.075% by weight of the polyethylene and was incorporated therein by milling. The samples of polyethylene were evaluated in a method similar to that described by Hawkins, Hansen, Matreyek and Winslow in Rubber Chemistry and Technology, October–November 1959, pages 1164–1170, except that an electrically heated aluminum block rather than an oven was used to maintain the desired temperature. The oxygen absorption of the sample was determined manometrically rather than volumetrically. In this method, samples of the polyethylene weighing about 0.5 g. are placed in separate 8 mm. glass tubes and the tubes then are inserted into horizontal rows of openings located concentrically around the heater. The temperature is maintained at about 140° C. The glass tubing also is packed with glass wool and molecular sieves to absorb the gases. Each of the glass tubes is connected to individual manometers containing mercury and the differential pressure is periodically determined. The induction period is taken as the number of hours required to reach a pressure differential of 20 cm. Hg.

The following table reports the results of a sample of polyethylene without inhibitor and a sample of the polyethylene containing 4-ethylthioethoxydiphenylamine.

*Table I*

| Inhibitor: | Induction period, hours to ΔP of 20 cm. Hg |
|---|---|
| None | 7.5 |
| 4-ethylthioethoxydiphenylamine | 440 |

From the data in the above table, it will be seen that the inhibitor of the present invention was extremely effective in extending the induction period of the polyethylene.

EXAMPLE XIII 4,4'-bis-(ethylthioethoxy)-diphenylamine, prepared as described in Example II, is used as an inhibitor in grease. The grease is a lithium grease and is prepared by mixing 91% by weight of highly refined lubricating oil with 8% by weight of lithium stearate. The mixture is heated at about 232° C. while agitating the same. Subsequently the grease is cooled, while agitating to 160° C. and, at this temperature, 0.3% by weight of the inhibitor is added. Agitation is continued, and the mixture is allowed to cool to about 120° C. and the grease then is further cooled slowly to room temperature.

The stability of the grease is tested according to a modified Norma Hoffmann method, in which a sample of the grease is placed in a bomb and oxygen is charged thereto. The bomb then is heated to 100° C. and the time required for a drop of 5 pounds pressure is taken as the induction period.

When evaluated in the above manner, a sample of the grease without inhibitor will have an induction period of 9 hours. The sample of the grease containing 0.3% by weight of 4,4'-bis-(ethylthioethoxy)-diphenylamine has a considerably longer induction period.

EXAMPLE XIV 2,4-bis-(propylthioethoxy)-diphenylamine, prepared as described in Example III, is used as an inhibitor in polypropylene. The inhibitor is incorporated in the polypropylene in substantially the same manner as described in Example XII, and the induction period of the sample is obtained in the same manner as described therein. When evaluated in this manner, it will be seen that the sample of polypropylene containing 2,4'-bis-(propylthioethoxy)-diphenylamine has a considerably longer induction period than the sample of the polypropylene which does not contain the inhibitor.

EXAMPLE XV

4 - methylthioethoxy-4'-methylthioethylaminodiphenylmethane, prepared as described in Example IV, is evaluated in dioctyl sebacate marketed under the trade name of "Plexol 201." This synthetic lubricating oil is being used commercially on a comparatively large scale.

The lubrciating oil is evaluated in accordance with a standard oxygen stability test, in which a 100 cc. sample of the lubricating oil is placed in a bath maintained at 400° F. and air is blown therethrough at a rate of 5 liters of air per hour. The sample of lubricating oil is examined periodically and the time to reach an acid number of 5 is reported. It is apparent that the longer the time required to reach an acid number of 5, the more stable is the sample of lubricating oil. In other words, it takes longer for the more stable oil to deteriorate.

A sample of the dioctyl sebacate, when evaluated in the oxygen stability test described above, develops an acid number of 5 within 9 hours. Incorporation of 1% by weight of the inhibitor of this example into the dioctyl sebacate considerably increases the time to reach an acid number of 5.

EXAMPLE XVI 2-butylthiomethoxydiphenylethane is used as an inhibitor in grease. The inhibitor is incorporated in the grease in the manner described in Example XIII and the grease is evaluated according to the modified Norma Hoffmann method described in Example XIII. Here again, it will be seen that the addition of 0.5% by weight of the inhibitor of the present invention serves to considerably prolong the induction period of the grease.

EXAMPLE XVII 4,4'-bis-(ethylthioethoxy)-diphenylpropane, prepared as described in Example VII, is used as an inhibitor in mixed copolymer of ethylene and propylene. The inhibitor is incorporated in the polymer in the manner described in Example XII, and the polymer sample containing the inhibitor is evaluated in the manner described therein. Here again, it will be seen that the addition of the inhibitor of the present invention serves to considerably prolong the induction period of the polymer.

EXAMPLE XVIII 4,4' - bis-(ethylthioethoxy)-diphenylsulfide, prepared as described in Example IX, is used as an inhibitor in rubber. 3% by weight of the inhibitor is incorporated into the rubber before vulcanization thereof and serves to retard oxidative deterioration of the rubber during subsequent use.

EXAMPLE XIX 4-ethylthioethoxydiphenylether, prepared as described in Example X, is used as an inhibitor in a synthetic lubricating oil consisting of mixed esters of trimethylolpropane. The lubricating oil is available commercially under the trade name of "Cellutherm." Typical properties of this lubricating oil are set forth below:

| | |
|---|---|
| Specific gravity, 60/60° F. | 0.965 |
| Acidity, mg./KOH/g. | 0.03 |
| Color, ASTM | 2 |
| Fire point, COC, ° F. | 520 |
| Flash point, COC, ° F. | 460 |
| Hydrolysis number | 0.27 |
| Viscosity at: | |
| −65° F., cs. | 14,900 |
| 100° F., SSU | 76.93 |
| 210° F., SSU | 37.77 |

The lubricating oil is evaluated in accordance with the standard oxygen stability test described in Example XV. The inhibitor is used in a concentration of 0.0033 mole per 100 cc. of lubricating oil, which is approximately 0.8% by weight of the lubricating oil.

Examples I through XI describe the preparation of specific compounds by the general method of reacting a hydroxy substituted diphenylamine, diphenylalkane, diphenylsulfide or diphenylether with a haloalkyl alkylsulfide, either with intimate stirring at atmospheric temperature or by refluxing, preferably with intimate stirring. In the compounds also containing an amino substitution, the reaction with the hydroxyl group apparently proceeds preferentially and then, when an excess of the haloalkyl alkylsulfide is present, the reaction occurs with the amino radical. It is understood that the details of the specific preparation of the examples may be varied in the preparation of these or other compounds of the invention. For example, when an arylthioalkoxy derivative is desired, a chloroalkyl arylsulfide is used as a reactant. In general, the time of reaction will range from about 4 to 24 hours or more, and usually will range from 6 to 12 hours. The reflux temperature will depend upon the specific solvent employed and may range from 80° C. to 200° C. or more, but should be below the boiling point of the reactants. Generally the haloalkyl alkylsulfide will be the lower boiling reactant and, therefore, the reflux temperature should be below the boiling point of this reactant. Instead of the chloroalkyl alkylsulfide or chloroalkyl arylsulfide, it is understood that the corresponding bromoalkyl alkylsulfide, bromoalkyl arylsulfide, iodoalkyl alkylsulfide or iodoalkyl arylsulfide may be used.

It is understood that any suitable solvent may be employed including methyl alcohol, ethyl alcohol, propyl alcohol, butyl alcohol, amyl alcohol, hexyl alcohol, heptyl alcohol, octyl alcohol, etc. Also, in place of sodium hydroxide or potassium hydroxide, other alkali metal hydroxides may be used including lithium hydroxide, rubidium hydroxide, cesium hydroxide, etc.

Following the reaction, the reaction mixture may be finished in any suitable manner to recover the desired product. Generally, this is effected by cooling the reaction mixture, removing the sodium chloride or other alkali metal halide by filtration, removing the solvent by evaporation and recovering the desired product by distillation, either as the overhead or as the residue, depending upon the boiling point of the specific product.

The above method of preparation generally is preferred, however, it is understood that any other suitable method of preparing these compounds may be employed. In another method, the hydroxydiphenylamine, hydroxydiphenylalkane, hydroxydiphenylsulfide or hydroxydiphenylether is reacted with a dihaloalkane, as for example, dichloromethane, dichloroethane, dichloropropane, dichlorobutane, etc., dibromomethane, dibromoethane, dibromopropane, dibromobutane, etc., diiodomethane, diiodoethane, diiodopropane, diiodobutane, etc. to form the corresponding haloalkoxydiphenyl compound, and then is reacted with a mercaptan including, for example, methyl mercaptan, ethyl mercaptan, propyl mercaptan, butyl mercaptan, amyl mercaptan, hexyl mercaptan, etc. in the presence of sodium hydroxide, potassium hydroxide, etc. to form the desired alkylthioalkoxydiphenyl compound or the bis-(alkylthioalkoxy)-diphenyl compound. Again, it is understood that when the corresponding arylthioalkoxy derivative is desired, the corresponding aryl mercaptan is utilized as a reactant.

We claim as our invention:

1. Organic substance normally subject to oxidative deterioration containing, as an inhibitor against said deterioration, from about 0.0001% to about 5% by weight of an inhibitor selected from the group consisting of alkylthioalkoxy substituted diphenylalkane, alkylthioalkoxy substituted diphenylsulfide, alkylthioalkoxy substituted diphenylether, arylthioalkoxy substituted diphenylalkane, arylthioalkoxy substituted diphenylsulfide, and arylthioalkoxy substituted diphenylether.

2. Organic substance normally subject to oxidative deterioration containing, as as inhibitor against said deterioration, 0.0001% to about 5% by weight of 4-alkylthioalkoxydiphenylalkane.

3. Organic substance normally subject to oxidative deterioration, containing, as an inhibitor against said deterioration, 0.0001% to about 5% by weight of 4,4'-bis-(alkylthioalkoxy)-diphenylalkane.

4. Organic substance normally subject to oxidative deterioration, containing as an inhibitor against said deterioration, 0.0001% to about 5% by weight of 4-alkylthioalkoxydiphenylsulfide.

5. Organic substance normally subject to oxidative deterioration, containing as an inhibitor against said deterioration, 0.0001% to about 5% by weight of 4-alkylthioalkoxydiphenylether.

6. Organic substance normally subject to oxidative deterioration, containing as an inhibitor against said deterioration, 0.0001% to about 5% by weight of 4,4'-bis-(alkylthioalkoxy)-diphenylether.

7. A compound selected from the group consisting of alkylthioalkoxy substituted diphenylalkane, alkylthioalkoxy, substituted diphenylsulfide, alkylthioalkoxy substituted diphenylether, arylthioalkoxy substituted diphenylalkane, arylthioalkoxy substituted diphenylsulfide, and arylthioalkoxy substituted diphenylether.

8. 4-alkylthioalkoxy-diphenylalkane.
9. 4-alkylthioalkoxy-diphenylsulfide.
10. 4-alkylthioalkoxy-diphenylether.

References Cited by the Examiner
UNITED STATES PATENTS

| | | | |
|---|---|---|---|
| 2,278,559 | 4/1942 | Paul | 260—808 X |
| 2,342,136 | 2/1944 | Gibbs | 260—808 |
| 2,367,264 | 1/1945 | Burk et al. | 252—47 |

DANIEL E. WYMAN, *Primary Examiner.*